United States Patent [19]

Chen

[11] 4,121,285
[45] Oct. 17, 1978

[54] AUTOMATIC ALTERNATOR FOR PRIORITY CIRCUIT

[75] Inventor: Frank K. Chen, Santa Ana, Calif.

[73] Assignee: Ultronic Systems Corporation, Mount Laurel, N.J.

[21] Appl. No.: 783,868

[22] Filed: Apr. 1, 1977

[51] Int. Cl.² ............................................... G06F 9/18
[52] U.S. Cl. ............................. 364/200; 364/900
[58] Field of Search ... 364/200 MS File, 900 MS File

[56] References Cited

U.S. PATENT DOCUMENTS

| | | | |
|---|---|---|---|
| 3,573,856 | 6/1969 | Best et al. | 340/172.5 |
| 3,949,371 | 4/1976 | Pederzini | 340/172.5 |
| 4,009,470 | 2/1977 | Danilenko et al. | 340/172.5 |

*Primary Examiner*—Mark E. Nusbaum
*Assistant Examiner*—C. T. Bartz
*Attorney, Agent, or Firm*—John F. Lawler

[57] ABSTRACT

An automatic alternator for a priority circuit comprises one or more flip-flop circuits connected to the channels of the priority circuit by a plurality of AND gate means which are responsive to outputs of the flip-flop circuits and of the priority circuit channels to alternate the servicing of successive simultaneous signals at two or more requesting ports. The flip-flop circuit input is connected to the requesting ports through an AND gate and changes its operating state in response to the presence of two simultaneous signals at the requesting ports and to a cyclically occurring clock input to the flip-flop circuit. When the operating state of the flip-flop circuit is changed to the alternating mode, the signal at the requesting port served by the priority circuit channel during the preceding cycle is blocked from that channel and another request signal appearing simultaneously at the remaining port or ports is applied to the other channel or channels. For a priority circuit having three or more channels, the automatic alternator circuit permits random or "free race" alternating servicing of simultaneous requests or alternatively may provide servicing of those requests in a predetermined sequence in the manner of a commutator.

8 Claims, 9 Drawing Figures

AUTOMATIC ALTERNATOR FOR PRIORITY CIRCUIT

BACKGROUND OF THE INVENTION

This invention relates to signal processing apparatus and more particularly to a circuit for alternating successive simultaneous service requests applied to a multichannel priority circuit.

A data processing device operating with more than one user device generally requires a priority circuit to determine which of the several user ports will be served next. There are two types of priority circuits. One operates on the preassigned priority basis in which requests for service are given different weights or priorities and are answered or served in accordance with that predetermination. In the other type of priority circuit, attempt is made to give all requests equal service. This invention is concerned with the latter type of priority circuit.

In the equal-priority circuit, request signals at the several input or request ports propagate through the circuit to the service or answering ports in a random or "free race" manner. The difficulty with the technique occurs when there are several requests at the same time for successive cycles. If this happens, the channel of the priority circuit having the shortest signal transit time due to manufacturing differences in circuit components allows the same requesting port to be successively served to the exclusion of other ports requesting service at the same time. Service to all the requesting ports is thus unevenly distributed when there are simultaneous requests on successive cycles.

OBJECTS AND SUMMARY OF THE INVENTION

A general object of this invention is the provision of a circuit which distributes simultaneous successive request signals through different channels of the priority circuit so as to evenly distribute the servicing of such requests.

This and other objects of the invention are achieved with a circuit having bistable means responsive to simultaneously occurring request signals on successive cycles to change operating states and to block service to the previously served requesting port while allowing service to the other port or ports.

DESCRIPTION OF PREFERRED EMBODIMENTS

Figure 1:
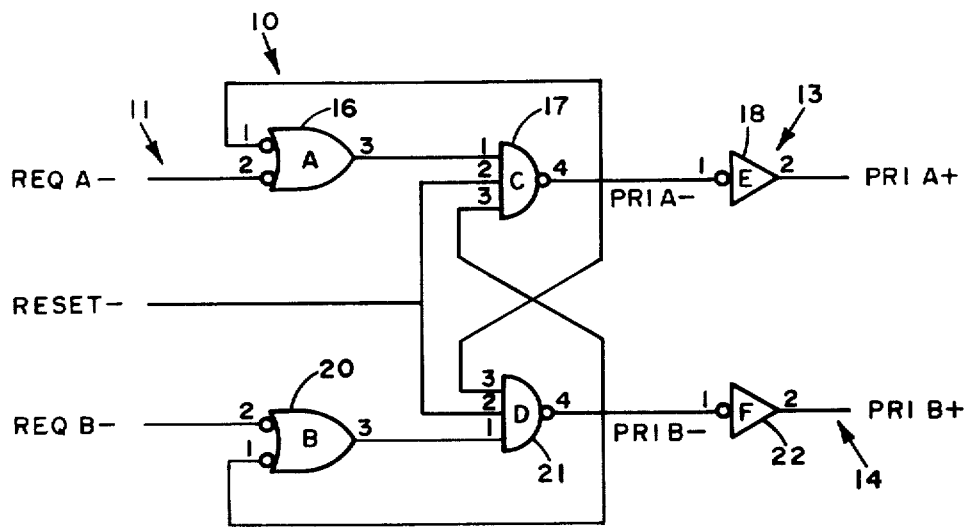
FIG. 1 is a schematic diagram of a two-port priority logic of the prior art.

Referring now to the drawings, FIG. 1 illustrates a priority circuit 10 having input ports 11 and 12 and output ports 13 and 14. The signals applied to input ports 11 and 12 are designated as Req A− and Req B−, respectively, to designate the requests of an interfacing apparatus for service and the corresponding signals appearing at the output ports 13 and 14 are designated Pri A+ and Pri B+, respectively; the priority circuit thus is a two-channel circuit.

The first channel of circuit 10 comprises an OR gate 16 with an output connected to AND gate 17, the output of the latter, designated as Pri A−, being connected to an inverter 18 and to the second input of OR gate 16. The second channel consists of OR gate 20 and AND gate 21 interconnected as described above with the output of AND gate 21, designated Pri B−, being connected to inverter 22 and to the second input of OR gate 20. The outputs of AND gates 17 and 21 are also connected as inputs to AND gates 21 and 17, respectively, so that an output at either AND gate blocks an output at the other. The third input to each of AND gates 17 and 21 is also connected to a source of cyclically occurring reset signals, designated Reset−.

Figure 2:
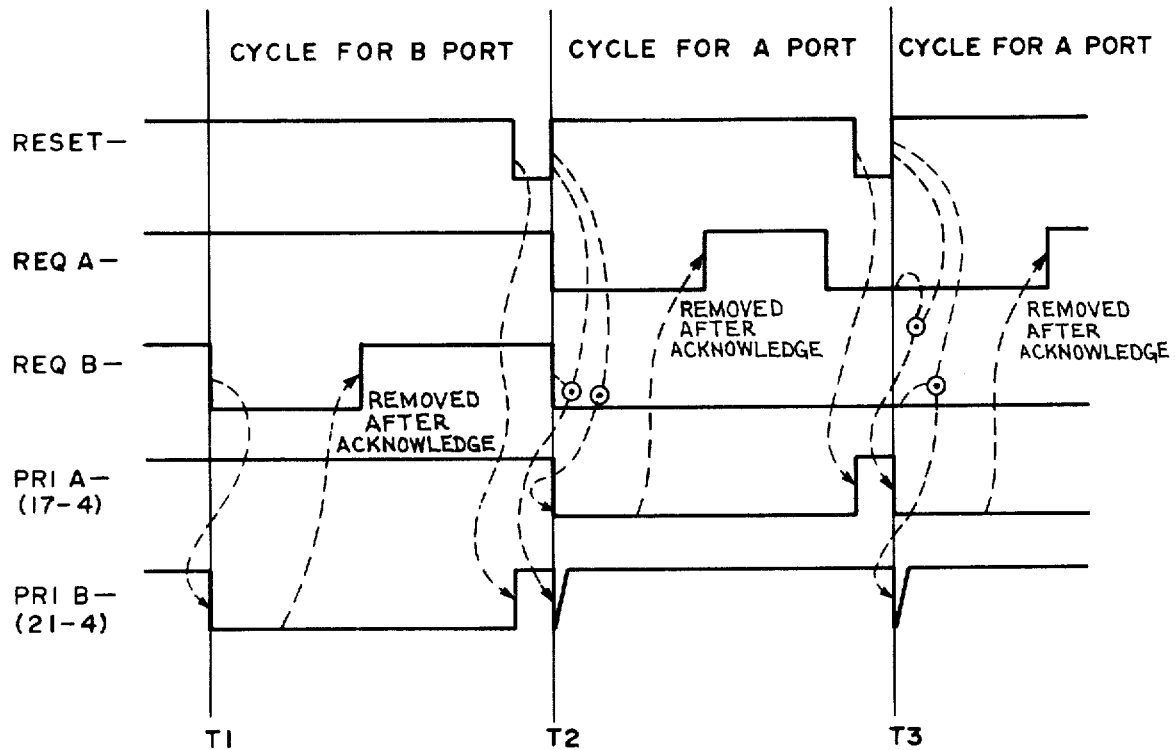
FIG. 2 is a timing diagram showing the operation of the priority logic of FIG. 1.

The operation of the priority circuit 10 is described in conjunction with the timing diagram shown in FIG. 2. Assume at time T1 that a request appears at the B port 12 as Req B− and that no signal appears at the A port 11. Under these circumstances, the request signal propagates through OR gate 20 and AND gate 21 and appears at the output of the latter as Pri B− as shown in FIG. 2. This cause and effect relation is indicated on the timing diagram by the dotted line with an arrow and is used throughout this description for this purpose. The symbol represents the summation of several causes to produce the effect indicated. The requesting signal at B port 12 is removed by an acknowledgement from the served apparatus to which output port 14 is connected and the reset pulse at the end of the first cycle returns AND gate 21 to its original state so that Pri B− goes high. At time T2 assume that requests for service occur simultaneously at both ports 11 and 12 so that Req A− and Req B− both go low as indicated. Both signals propagate through the priority circuit channels but, assuming that the signal transit time through gates 16 and 17 is less than through gates 20 and 21, the Req A− signal will "win the race" so that an output from AND gate 17 occurs first causing AND gate 21 to be cut off and blocking a request for service from port 14. This is indicated by the short dip and quick return of the Pri B− trace to its original level while Pri A− remains low throughout the cycle. At time T3 assume again that service requests appear at both A port 11 and B port 12 with Req A− and Req B− going low. Again, the request to the A port 11, i.e., Req A−, is served whereas the request to B port 12 is not served due to the inherently faster-acting components in the first channel. Since the purpose of the priority circuit is to distribute service equally to the requesting ports, this purpose is defeated as a result of the different signal transit times of the two channels.

Figure 3:
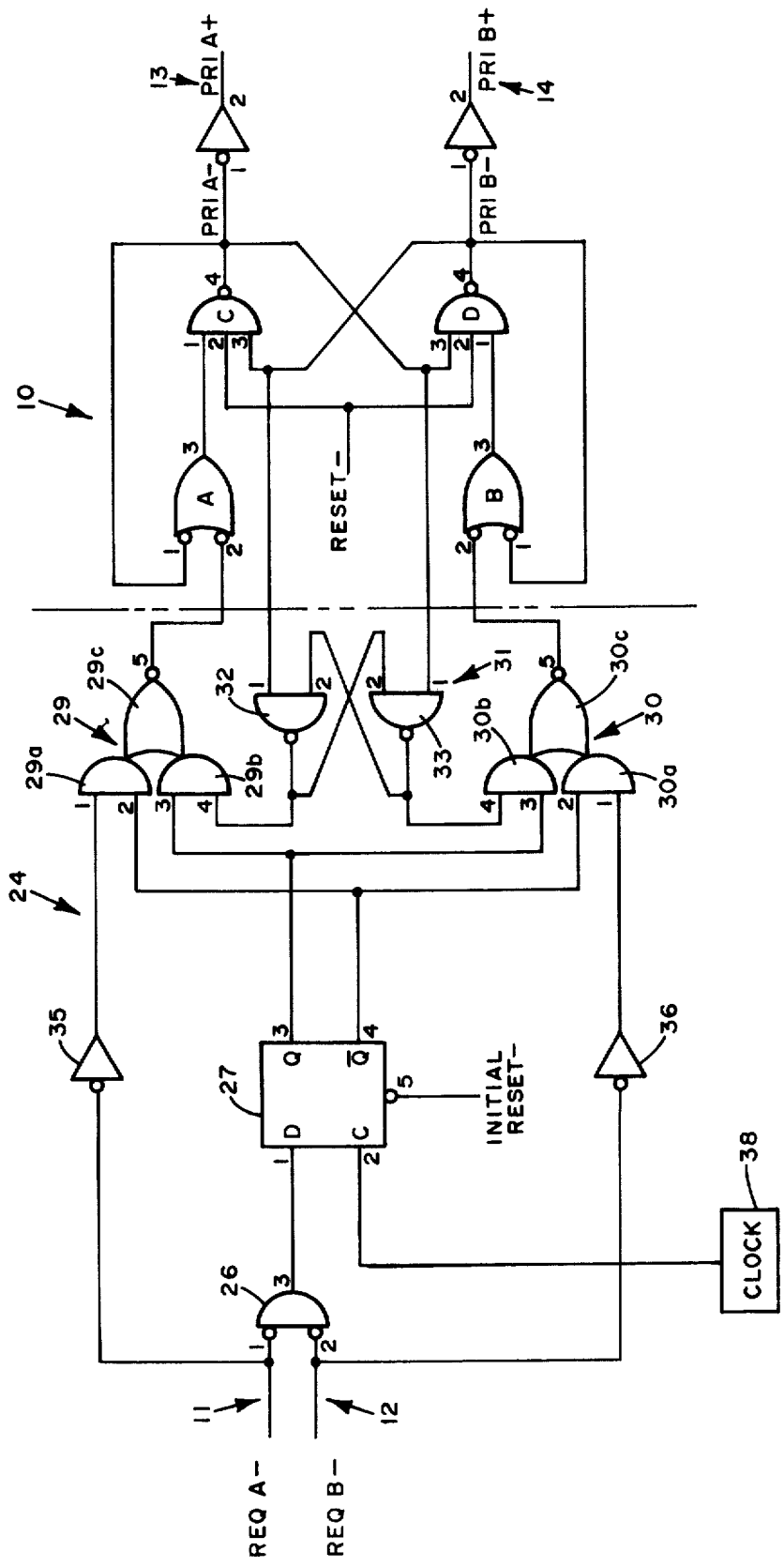
FIG. 3 is a schematic diagram of priority logic of FIG. 1 in combination with an alternator circuit embodying this invention.

In accordance with this invention, an alternator circuit 24, see FIG. 3, is connected between requesting ports 11 and 12 and the two output channels 13 and 14 of priority circuit 10. Since circuit 10 is identical to that described in FIG. 1, no further description of it is necessary. Alternator circuit 24 comprises an AND gate 26, a bistable switching device or flip-flop circuit 27, AND gate means 29 and 30, and a latching circuit 31 having AND gates 32 and 33. A port 11 and B port 12 are connected to input terminals 26-1 and 26-2, respectively, of AND gate 26 and are also connected through inverter amplifiers 35 and 36, respectively, to the respective inputs of gate means 29 and 30.

Flip-flop 27 has an input 27-1 connected to the output 26-3 of AND gate 26 and has an input 27-2 connected to the output of a clock 38. Outputs 27-3 and 27-4 of circuit 27 are connected to inputs of AND gate means 29 and 30, respectively, as shown. A reset terminal 27-5 provides a means for cyclically resetting the circuit. The outputs from terminals 27-3 and 27-4 are complementary, i.e., when 27-3 is high, 27-4 is low and vice versa, and determine when the circuit is in the alternating or non-alternating state.

AND gate means 29 comprises AND gates 29a and 29b and OR gate 29c connected so the output of each AND gate is an input to the OR gate. AND gate means 30 similarly comprises AND gates 30a and 30b and OR gate 30c connected as described above. Thus inputs 29-1 and 29-2 are "anded" to produce an output at 29-5 while inputs 29-3 and 29-4 are "anded" to produce a similar output at 29-5. Gate means 30 operates in the same manner.

Latching circuit 31 is responsive to the outputs of priority circuit 10 for controlling the operation AND gate means 29 and 30. Thus, inputs 32-1 and 33-1 of AND gates 32 and 33 are connected to outputs D-4 (Pri B−) and C-4 (Pri A−), respectively, of the priority circuit whereas inputs 32-2 and 33-2 are connected to the outputs 33-3 and 32-3, respectively, of these AND gates to interlock their operation. The latching circuit 31 in essence "remembers" which port of the priority circuit was served last.

Figure 4:
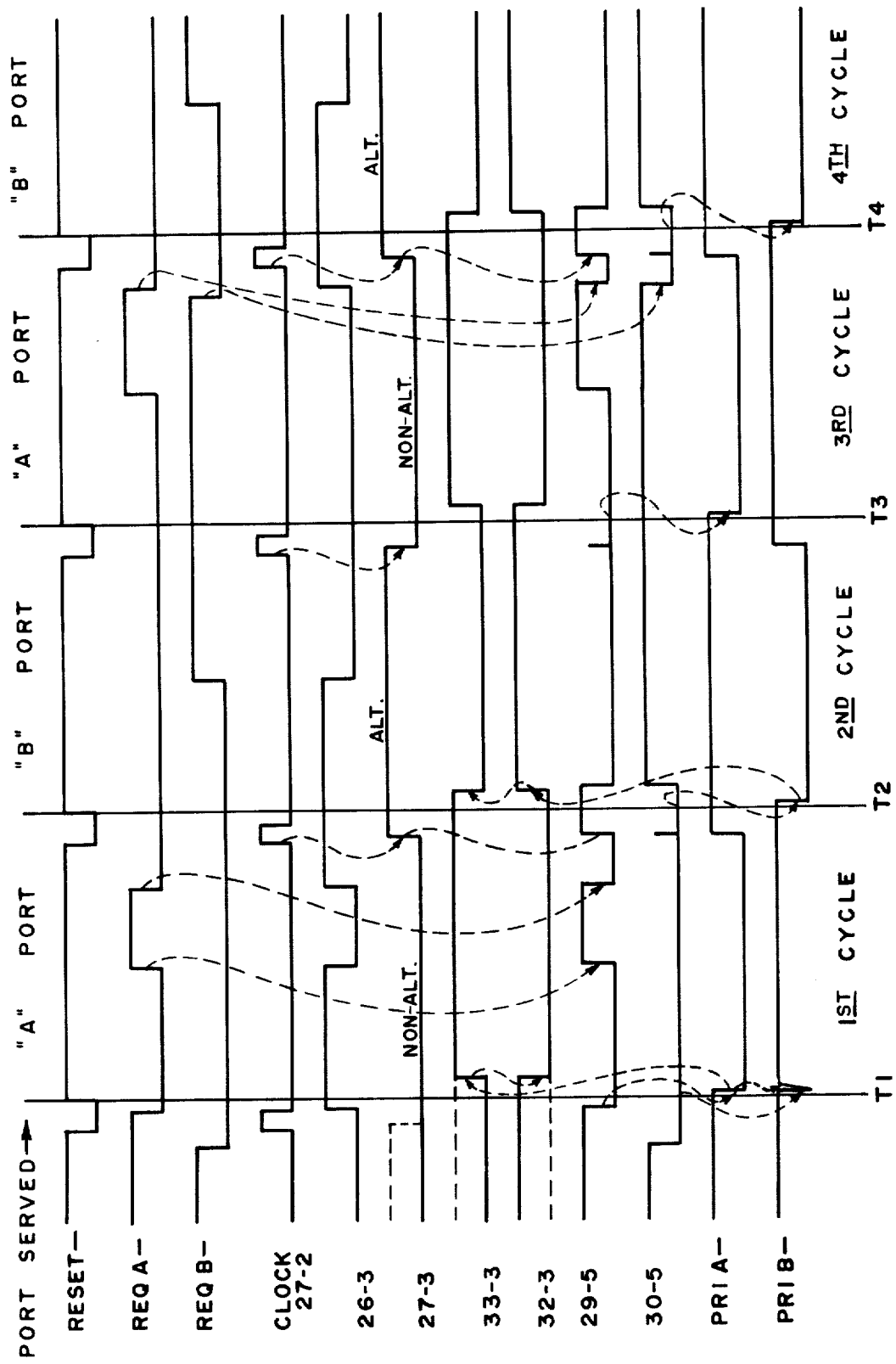
FIG. 4 is a timing diagram illustrating the operation of the circuit of FIG. 3.

The operation of the alternator circuit and priority circuit of FIG. 3 is illustrated in the timing diagram of FIG. 4. At time T1 when the priority circuit has been reset, requests Req A− and Req B− are assumed to occur simultaneously, indicated by both traces going low, producing an output at 26-3 from AND gate 26. Since output signal 26-3 occurs after the clock pulse 27-2 flip-flop circuit 27 remains in its initial or non-alternating state as shown at the output 27-3. The requesting signals Req A− and Req B− both propagate through inverters 35 and 36, respectively, as indicated immediately preceding time T1. It is assumed, by way of example, that the first or A channel of priority circuit 10 has the faster reaction time and therefore an output appears at C-4 as Pri A− while negative dip only appears at Pri B−. The Pri A− output is fed back to latching circuit 31 causing AND gate output 33-3 to go high and AND gate output 32-3 to go low. During the first cycle, Req A− goes high as a result of acknowledgment of service from the served apparatus and this causes output 29-5 to go high and output 26-3 to go low. It is noted, then that because of the faster signal transit time of gates A and C of priority circuit 10, the Req A− signal "won the race" although both Req A− and Req B− were present at the start of the cycle.

Near the end of the first cycle prior to time T2, it is assumed that another request Req A− appears again while the unanswered request Req B− is still awaiting action. This produces an output at 26-3 which goes high and causes output 29-5 to go low. Thereafter at the time of a clock pulse at 27-2, flip-flop circuit 27 changes operating states from non-alternating to alternating. This is indicated by the change of 27-3 from low to high which in turn causes 29-5 to go high while output 30-5 remains low. With Req B− and output 30-5 both low after the Reset- pulse at time T2, a signal appears at the output of the B channel of priority circuit 10 as indicated by Pri B− going low and thus request Req B− is served. This causes latching gates 32 and 33 to reverse states as indicated by 32-3 going high and 33-3 going low. Req B− then goes high when service is acknowledged by the served apparatus and 26-3 goes low.

At the next clock pulse 27-2 at the end of the second cycle and prior to time T3 it is assumed that a request exists only at the "A" port so that there is no output 26-3 from the AND gate 26 at this time. The input of clock pulse 27-2 to flip-flop circuit 27 under these circumstances causes the latter to return to its original or non-alternating state so that 27-3 changes from high to low.

At time T3 it is assumed there is only one request, Req A−, which propagates through inverter 35, gate means 29 and gates A and C of priority circuit 10 to produce an output at gate C-4 so that Pri A− goes low as shown. During this third cycle, the served apparatus at port 13 acknowledges service causing Req A− to go high as does output 29-5.

Assume at the end of the third cycle that two simultaneous requests for service are made and Req A− and Req B− both go low as shown. This causes outputs 29-5 and 30-5 to go low as a result of the propagation of the signals through inverters 35 and 36. However, when clock signal 27-2 occurs immediately prior to time T4 causing flip-flop 27 to change states with its output 27-3 going from the non-alternating to alternating mode, output 29-5 returns to the high position while output 30-5 remains low. After the reset pulse at T4, the 30-5 output then propagates through the priority circuit and appears as an output Pri B− to provide service in response to request Req B−.

It will be apparent from the above description that alternator 24 operates to provide alternating service to the two requesting ports when simultaneous requests are present on successive cycles at these ports.

Figure 5:
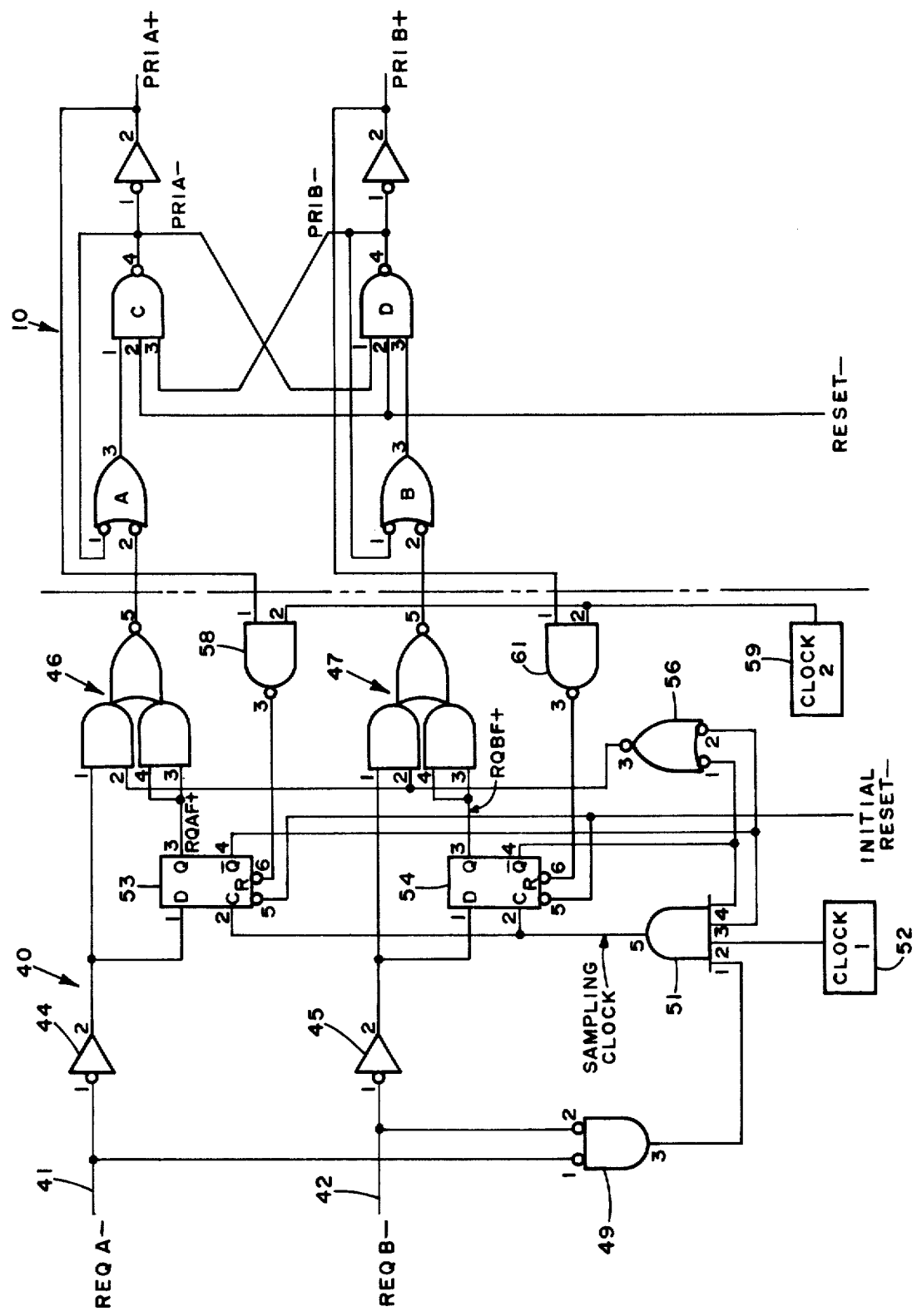
FIG. 5 is a schematic diagram similar to FIG. 3 showing a modified form of the invention.

A modified form of the invention useful with two requesting ports is shown in FIG. 5 and comprises an alternator 40 connected to priority circuit 10 which is substantially identical to the priority circuit described above. Alternator 40 has two requesting ports 41 and 42 to which service requesting signals Req A− and Req B− are respectively applied. Ports 41 and 42 are connected through inverters 44 and 45, respectively, as inputs to AND gate means 46 and 47, respectively. Ports 41 and 42 are also connected to AND gate 49 which produces an output at terminal 49-3 when two service requests appear simultaneously at ports 41 and 42. The output terminal 49-3 of AND gate 49 is connected to one of a plurality of inputs to AND gate 51.

The outputs of inverters 44 and 45 are connected as inputs to flip-flop circuits 53 and 54, respectively, which have respective second input terminals 53-2 and 54-2 connected to the output terminal 51-5 of AND gate 51. Output terminals 53-3 and 54-3 of the flip-flop circuits are connected as inputs to AND gate means 46 and 47, respectively, and provide an indication of the propagation of the request signals if these outputs are binary highs as indicated by the designation RQAF+ and RQBF+, respectively. That is to say, if flip-flop output 53-3 is a binary high, the signal propagates through AND gate means 46 and appears as an output at 46-5 which is connected to the input of A channel of priority circuit 10. Similarly, if flip-flop output 54-3 is a binary high, the signal propagates through AND gate means 47 and appears at terminal 47-5 which is connected to the input of B channel of the priority circuit. It will be noted that input terminals 3 and 4 of AND gate means 46 and 47, respectively, are connected together as shown in the drawing so that the RQAF+ and RQBF+ signals propagate through AND gate means 46 and 47, respectively, whenever the flip-flop circuits are in the corresponding operating states.

The second output terminals 53-4 and 54-4 are connected as inputs to AND gate 51 and to an OR gate 56 which has an output terminal 56-3 connected as an input to each of AND gate means 46 and 47 to be "anded" with the request outputs from inverters 44 and 45, respectively. The purpose of OR gate 56 is to control the propagation of request signals directly through AND gate means 46 and 47 when two such requests appear simultaneously at the input ports 41 and 42 at the beginning of a cycle, in which instance the processing of the request is controlled by flip-flop circuits 53 and 54. Thus the binary state of the output 56-3 of OR gate 56 determines whether alternator circuit 40 is in the alternating or non-alternating mode.

Flip-flop circuit 53 has a reset terminal 53-5 connected to a source not shown for an initial reset action and has a second reset terminal 53-6 connected by AND gate 58. The two inputs to AND gate 58 are connected to the Pri A+ output of the A channel from the priority circuit and from a second clock 59, respectively. Similarly, flip-flop circuit 54 has a reset terminal 54-6 connected to the output of AND gate 61 having inputs connected to the output Pri B+ of priority circuit B channel and clock 59, respectively. Thus AND gates 58 and 61 effectively reset the associated flip-flop circuits at a predetermined time in the cycle when the respective requesting ports are served.

Figure 6:
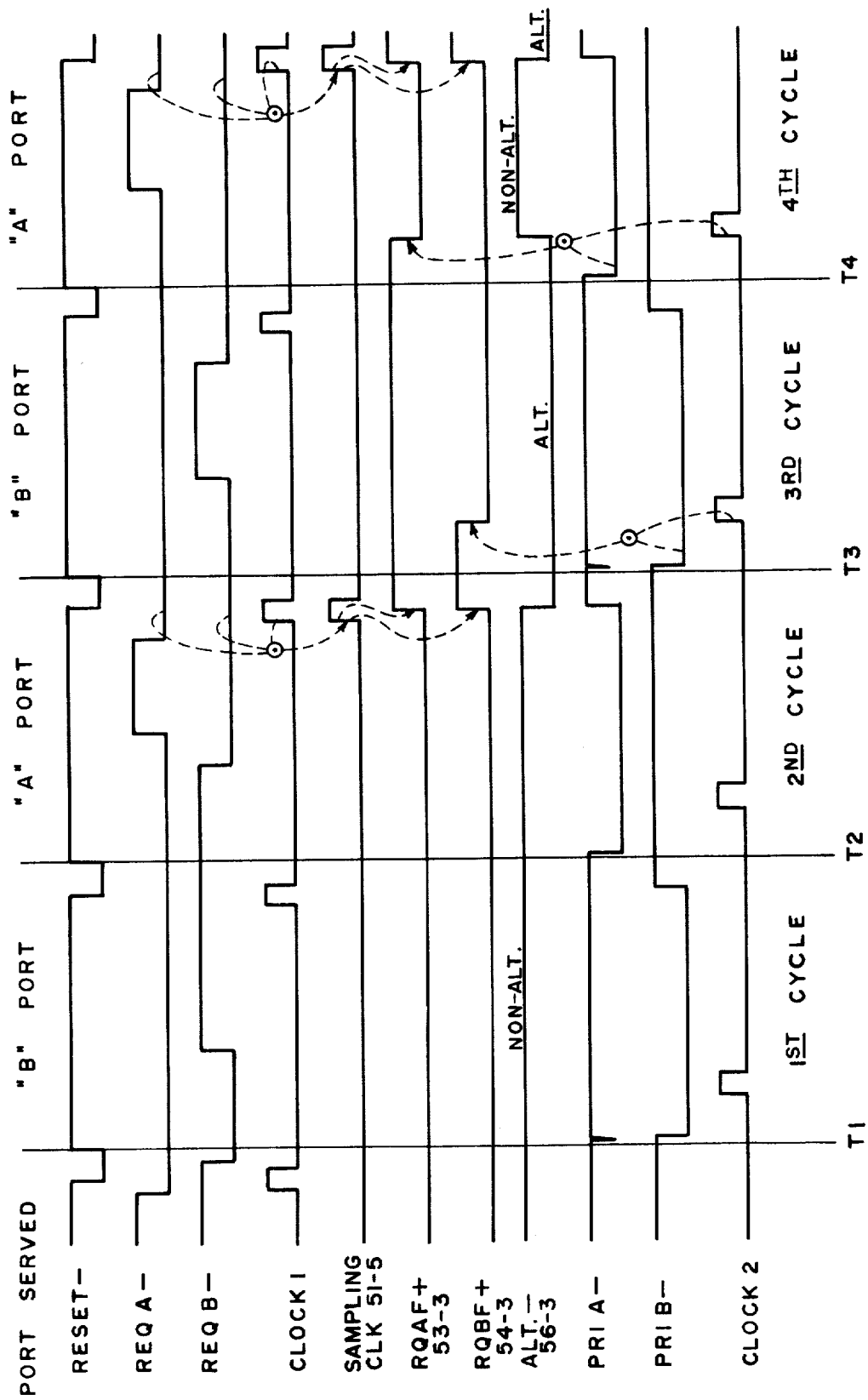
FIG. 6 is a timing diagram for the circuits of FIG. 5.

The operation of alternator circuit 40 will now be explained in conjunction with the timing diagram of FIG. 6. Beginning at time TI, assume that requests Req A— and Req B— appear simultaneously at ports 41 and 42 so that these signals are at a binary low. Also assume that the B channel (gates B and D) of priority circuit 10 has the faster signal transit time. Under these circumstances, both request signals propagate through AND gate means 46 and 47, respectively, and appear as simultaneous inputs to priority circuit 10. On the basis of the assumption made above, the input to the B channel "wins the race" so that the signal Pri B— goes low while Pri A— remains high.

At time T2 assume there is only one request to be served, Req A—. In this case Pri A— goes low while Pri B— remains high, there being no race under the circumstances.

Near the end of the second cycle prior to time T3, assume that two requests appear at ports 41 and 42 with both Req A—0 and Req B— going low. This condition is sensed by AND gate 49 producing an output at 49-3 which forms one input to AND gate 51. When the pulse from clock 51 is applied at 51-2, assuming inputs 51-3 and 51-4 are also high, an output 51-5, called a "sampling clock", appears for sampling flip-flop circuits 53 and 54. With inputs 53-1 and 54-1 at binary highs, the sampling clock pulse from 51-5 causes flip-flops 53 and 54 to change states producing at 53-3 and 54-3 the signals RQAF+ and RQBF+, respectively. Since the flip-flops have changed states, OR gate 56 responds to this change so that 56-3 goes low and blocks the direct connection of the requesting ports to the priority circuit channels. With OR gate producing a binary low output, the gate is in the alternating state, designated "Alt.", at the beginning of the third cycle at time T3.

Assume that there are two requests at ports 41 and 42 at the start of the third cycle as indicated by the binary low states of Req A— and Req B— on the timing diagram. With OR gate output 56-3 at a binary low, i.e., in the alternating state, the requesting signals are directed through flip-flop circuits 53 and 54, more specifically to input terminals 53-1 and 54-1, respectively, of those circuits. The outputs RQAF+ and RQBF+ from those circuits propagate through AND gate means 46 and 47 to both inputs of priority circuit 10. As a result of the "free race" of both signals through the priority circuit, based on the previous assumption that the B channel is the faster, the output Pri B— goes low while Pri A— remains high. The feedback of Pri B+ through AND gate 61 at the time of the pulse from clock 2 pulse, flip-flop circuit 54 is reset so that RQBF+ goes low as indicated.

Assume at the start of the fourth cycle at time T4 that there are again two requests for service at ports 41 and 42 indicated by Req A— and Req B— in the low binary states. Since flip-flop 54 has been reset whereas flip-flop 53 has not, the output RQAF+ of the latter is applied through AND gate means 46 to the A channel of the priority circuit and appears as the output thereof Pri A— which resets flip-flop 53 at the time of the pulse from clock 2. Thus service to the two requesting ports is given on an alternating basis in the event such a request condition is repeated on successive cycles.

Figure 7:
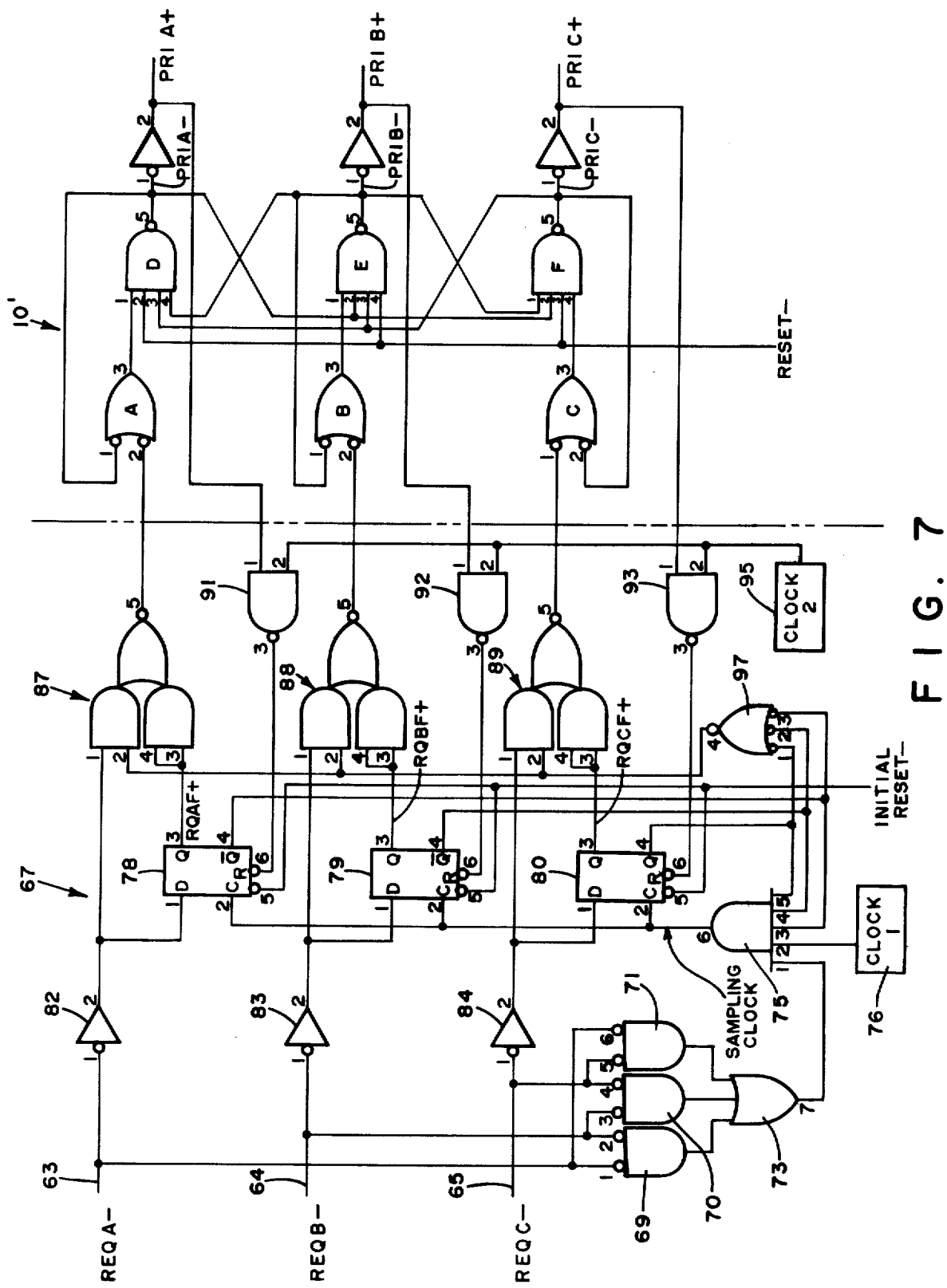
FIG. 7 is a diagram similar to FIG. 5 showing the invention modified for use with three requesting ports.

FIG. 7 illustrates an embodiment of the invention used with three requesting ports 63, 64 and 65 and a corresponding three-channel priority circuit 10′ constructed essentially the same as priority circuit 10 described above except that each of AND gates D, E and F has four inputs to provide for the desired interlocking with the other two gates. The alternator circuit, designated as 67, comprises three AND gates 69, 70 and 71 with outputs connected to OR gate 73. The inputs to AND gates 69, 70 and 71 are connected across the three pairs of requesting ports so that simultaneous requests applied to any two of the ports will produce an output from one of the AND gates and thus an output from OR gate 73. The output 73-7 from OR gate 73 is connected to one of a plurality of input terminals of AND gate 75. Another input to AND gate 75 is derived from clock 76. When two or more requests are made simultaneously at the input ports, an output at 75-6 is generated at the time of the clock pulse at 75-2, assuming the other inputs to the AND gate 75 are in the same binary state. As above, the output 75-6 is called a sampling clock pulse.

Alternator circuit 67 has three flip-flop circuits 78, 79 and 80 having first inputs connected respectively to the three requesting ports through inverter amplifiers 82, 83 and 84, respectively, and second inputs connected to the output 75-6 of AND gate 75. Outputs 78-3, 79-3 and 80-3 of flip-flops 78, 79 and 80, respectively, are connected to respective inputs of AND gate means 87, 88 and 89; the AND gate means being configured as shown and as described above to cause the inputs from the flip-flops, designated RQAF+, RQBF+ and RQCF+, respectively, to propagate through the gate means and appear as outputs at 87-5, 88-5 and 89-5 for connection to the respective channels of the priority circuit 10′.

As described above, the three flip-flops are reset by outputs from AND gates 91, 92 and 93, respectively, having inputs connected to the output of clock 95 and of priority circuit channels Pri A+, Pri B+ and Pri C+, respectively. An Or gate 97 comparable to gate 56 of FIG. 5 receives outputs from terminals 78-4, 79-4 and 80-4 of the flip-flops to block direct transmission of requesting signals through AND gate means 87, 88 and 89 when two or more requests appear at the requesting ports simultaneously.

Figure 8:
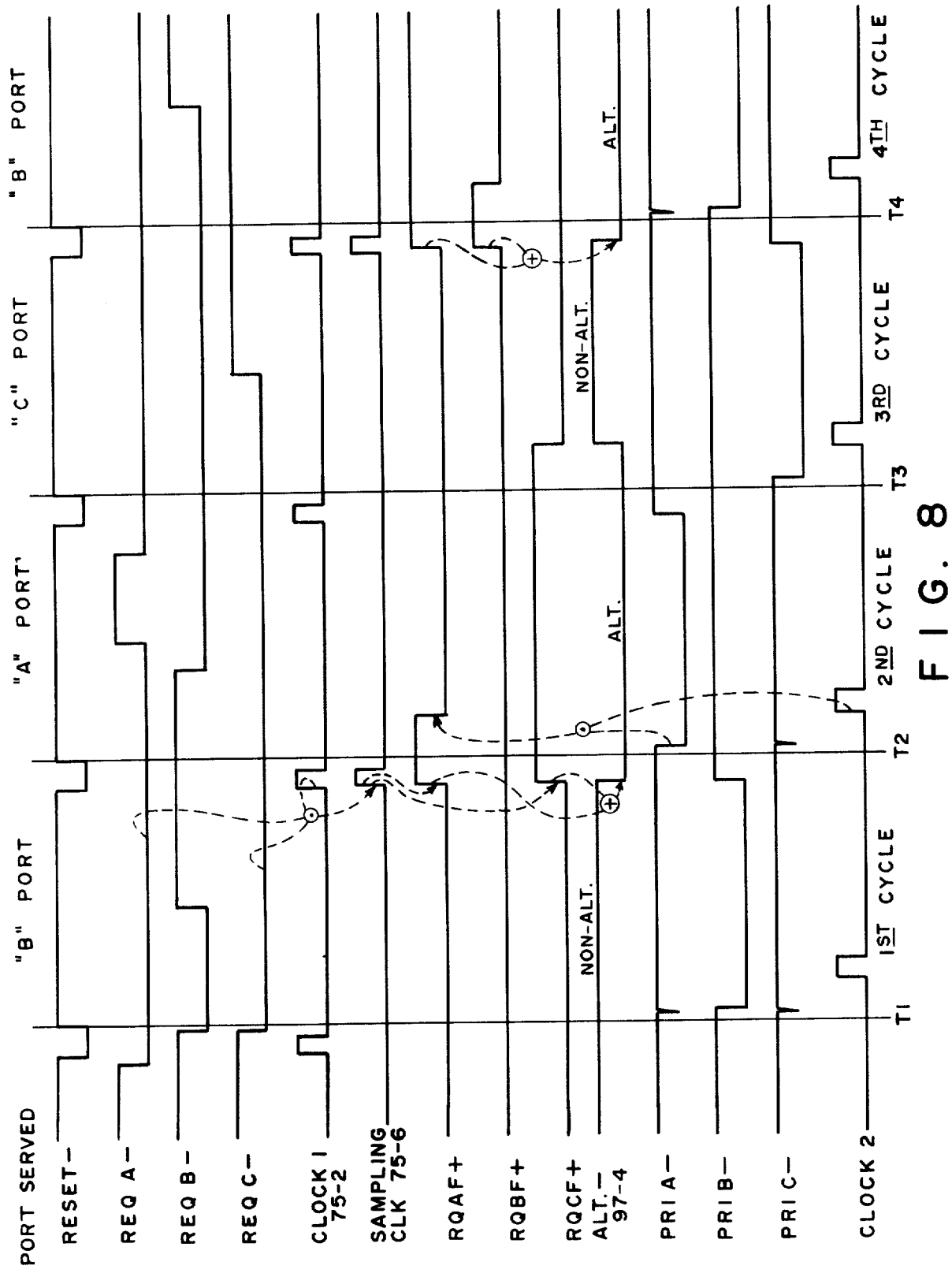
FIG. 8 is a timing diagram for the circuit of FIG. 7.

The operation of the three ports alternator circuit 67 will be explained with reference to the timing diagram of FIG. 8. Assume at time T1 that there are three requests Req A−, Req B− and Req C− at ports 63, 64 and 65, respectively. Assume also that of the three channels in priority circuit 10', the second or B channel has the fastest signal transit time. The three simultaneous request signals propagate through the inverter amplifiers and AND gate means 87, 88 and 89, respectively, and are applied to the inputs of the three priority circuit channels. On the basis of the foregoing assumptions, a free race of the signals through the priority circuit will result in an output Pri B− from gate E while outputs from the other channels are blocked.

At the end of the first cycle prior to time T2, assuming requests Req A− and Req C− continue, the presence of two signals at the requesting ports is sensed by AND gate 71 which produces a signal to input 75-1 of AND gate 75. At the time of the pulse from clock 76 at input terminal 75-2, a sampling clock pulse output appears at 75-6 since the other inputs 75-3, 75-4 and 75-5 are also at binary high. This sampling clock pulse changes the states of flip-flops 78 and 80 since these circuits are already conditioned by request signals from ports 63 and 65, respectively. This causes the outputs RQAF+ and RQCF+ at terminals 78-3 and 80-3, respectively, to go high and to propagate through AND gate means 87 and 89 for application as inputs to the A and C channels of priority channel 10'. At the same time, OR gate 97 produces an output at 97-4 which blocks the direct connection of the three requesting ports to the channels of priority circuit 10'.

With inputs to the A and C channels of priority circuit 10', there is again a free race and this time it is assumed that the A channel has a faster signal transit time compared to that of the B channel so that output Pri A− goes low as indicated. At the time of the output of clock 95, AND gate 91 produces an output at 91-3 which resets flip-flop 78 causing RQAF+ to go low while RQCF+ remains high as shown.

At time T3 or the beginning of the third cycle, with the output RQCF+ from flip-flop 80, being the only output from the three flip-flops and with gate 97 in the alternating state, an output appears at 89-5 of AND gate means 89 and propagates through the C channel of the priority circuit to appear as Pri C−. Again at the time of the output of clock 95, AND gate 93 produces an output at 93-3 which resets flip-flop 80 so that all of the three flip-flop circuits are in the reset state.

Prior to time T4, and assuming requests Req A− and Req B− at ports 63 and 64, gate 69 senses this condition and produces an output which ultimately appears as an input at 75-1 of gate 75. At the time of clock pulse 75-2 a sampling clock pulse at 75-6 causes flip-flops 78 and 79 to change to the set state so that a free race between the resulting inputs to channels A and B of the priority circuit 10' occurs. Since, as assumed previously, the B channel has the fastest signal transit time, the request Req B− will win the race as indicated by Pri B− going low.

It may be desirable to replace the "free race" mode of operation of the alternator circuit 67 with operation in accordance with a predetermined sequence. This result is achievable through a slight modification of alternator circuit 67 to convert it to a predetermined sequence or commutating alternator 67' shown in FIG. 9. The only circuit differences between alternators 67' and 67 are in the connections of inputs to AND gate means 88' and 89' of the former, the remainder of the circuit components and their interconnection being identical with that of alternator 67. Input terminal 88'-4 of AND gate means 88' is connected to terminal 78-4 of flip-flop circuit 78. Gate means 89' has six input terminals with terminals 89'-6 and 89'-4 being connected to terminals 78-4 and 79-4, respectively, of the respective flip-flops 78 and 79. The remaining three input terminals of gate means 89' are connected in the manner described above and shown in FIG. 7.

Figure 9:
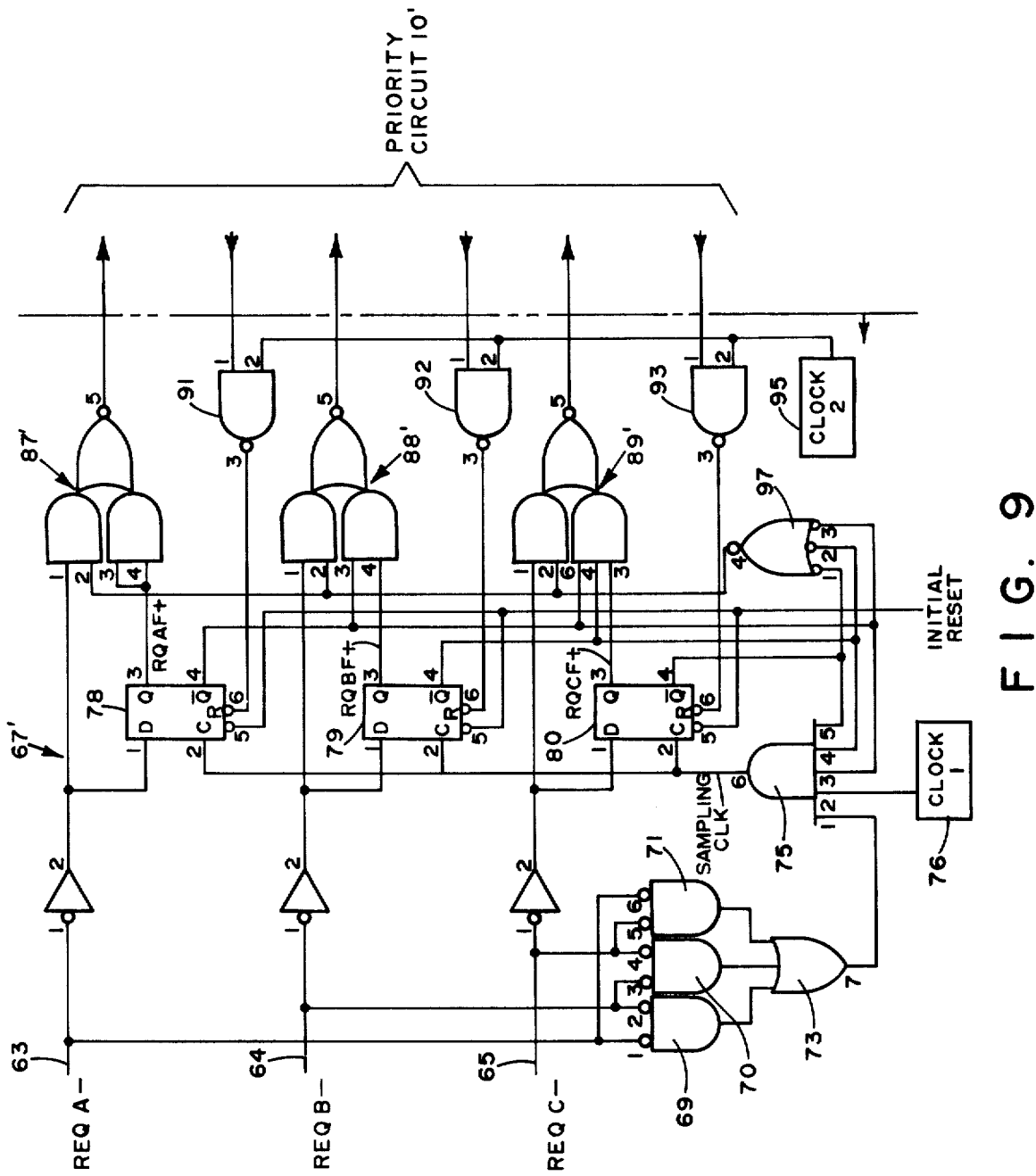
FIG. 9 is a circuit diagram showing still another modified form of the invention.

The effect of these circuit changes in FIG. 9 is to convert the alternator to a commutating alternator, i.e., a commutator which automatically determines the priority of sequence of serving the multi-request signals and by skipping non-requesting ports. Thus, if requests Req A−, Req B− and Req C− are simultaneously applied to input ports 63, 64 and 65, respectively, and remain present during successive cycles of operation, commutator circuit 67' provides for serving those requests in the aforementioned order, i.e., Req A− first, Req B− second, and Req C− third. By simple modification of the AND gate means service may be provided by any desired sequence.

What is claimed is:

1. In a data processing device having at least two service requesting ports and a like number of service answering ports, said device having a priority circuit with first and second channels connected to said answering ports, respectively, each of said channels having an AND gate with a plurality of input lines and an output line connected to an answering port, the output line of each of said gates being connected to one of the input lines of the AND gate of the other channel whereby the enablement of one of said gates disables the other, reset means connected to an input line of each of said gates for cyclically resetting the latter, the improvement of a circuit for distributing successive simultaneous service requests at said requesting ports to different channels of said priority circuit comprising first AND gate means having input terminals connected to said requesting ports, respectively, and having an output terminal, said first gate means being responsive to simultaneous signals at said requesting ports for producing a signal at said output terminal, second and third AND gate means, each having a plurality of input terminals and an output terminal, the output terminals of said second and third gate means being connected to the inputs, respectively, of said priority circuit channels, said requesting ports being connected to inputs of said second and third gate means, respectively, bistable means having a plurality of input and output terminal means and first and second operating states, said input terminal means of said bistable means being operatively connected to the outputs of said first gate means and said output terminal means of the bistable means being connected to the input terminals of said second and third and gate means, said bistable means being responsive to simultaneous signals in the outputs of said first AND gate means to change from the first operating state to the second operating state, and means responsive to the outputs of said first and second priority circuit channels and operatively connected to the inputs of said second and third gate means for blocking the input from the requesting port to the immediately previously served priority channel when successive service requests are simultaneously applied to said requesting ports.

2. The device according to claim 1 in which said last named means comprises fourth and fifth gate means connected to the outputs, respectively, of said priority channels and being responsive thereto to produce outputs, respectively, said second and third gate means being responsive to said outputs, respectively, of said fourth and fifth gate means.

3. The device according to claim 1 in which said last named means comprises an OR gate having inputs connected to said output terminal means of said bistable means and an output connected to an input of each of said second and third gate means whereby a change in operating state of the bistable means in response to the output of said first AND gate means blocks direct connection of said requesting ports to the priority channel inputs through said second and third AND gate means.

4. The device according to claim 3 in which said first AND gate means comprises first and second AND gates, said first AND gate having inputs connected to said requesting ports, respectively, and having an output, said second AND gate having inputs connected, respectively, to said output of the first AND gate and to said output terminal means of the bistable means.

5. The device according to claim 1 with clock means operative to periodically produce an output, said bistable means comprising a flip-flop circuit having first and second input terminals and first and second output terminals, said first input terminal of said flip-flop circuit being operatively connected to the output terminal of said first AND gate means, said second input terminal of said circuit being connected to said output of said clock means, said first output terminal of the flip-flop circuit being connected to one set of input terminals of said second and third AND gate means, said second output terminal of the flip-flop circuit being connected to a second set of input terminals of said second and third AND gate means.

6. The device according to claim 5 in which each of said second and third AND gate means comprises two AND gates and an OR gate connected to the outputs of said AND gates, the first output terminal of said flip-flop circuit being connected to an input terminal of one of said AND gates of each of said second and third gate means, the second output of said flip-flop circuit being connected to an input terminal of the other of said AND gates of each of said second and third gate means.

7. In a data processing device having at least two service requesting ports and a like number of service answering ports, said device having a priority circuit with first and second channels connected to said answering ports, respectively, each of said channels having an AND gate with a plurality of input lines and an output line connected to an answering port, the output line of each of said gates being connected to one of the input lines of the AND gate of the other channel whereby the enablement of one of said gates disables the other, reset means connected to an input line of each of said gates for cyclically resetting the latter, the improvement of a circuit for distributing successive simultaneous service requests at said requesting ports to different channels of said priority circuit comprising first AND gate means having input terminals connected to said requesting ports, respectively, and having an output terminal, said first gate means being responsive to simultaneous signals at said requesting ports for producing a signal at said output terminal, second and third AND gate means, each having a plurality of input terminals and an output terminal, the output terminals of said second and third gate means being connected to the inputs respectively, of said priority circuit channels, said requesting ports being connected to inputs of said second and third gate means, respectively, at least two flip-flop circuits having a plurality of input and output terminal means and first and second operating states, clock means, said input terminal means of said flip-flop circuits being operatively connected to the outputs of said first gate means and said output terminal means of the flip-flop circuits being connected to the input terminals of said second and third gate means, said flip-flop circuits being responsive to simultaneous signals in the outputs of said first AND gate means to change from the first operating state to the second operating state, fourth and fifth gate means connected to the outputs, respectively, of said priority channels and being responsive thereto to produce outputs, respectively, said second and third gate means being responsive to said outputs, respectively, of said fourth and fifth gate means, said flip-flop circuits having two input terminals and a reset terminal and first and second output terminals, the reset terminal of said flip-flop circuits being connected to the outputs, respectively, of said fourth and fifth gate means, one of said input terminals of one of said flip-flop circuits being connected to one of said requesting ports, one of said input terminals of the other of said flip-flop circuits being connected to the other requesting port, the others of said input terminals of said first and second flip-flop circuits being operatively connected to said first AND gate means, said first AND gate means comprising first and second AND gates, said first AND gate having two input terminals connected to said requesting ports, respectively, and an output terminal, said second AND gate having a plurality of input terminals and an output terminal, one of the input terminals of the second AND gate being operatively connected to the output terminal of said first AND gate, and another input terminal of said second AND gate being connected to the output of said clock means.

8. In a data processing device having at least two service requesting ports and a like number of service answering ports, said device having a priority circuit with first and second channels connected so said answering ports, respectively, each of said channels having an AND gate with a plurality of input lines and an output line connected to an answering port, the output line of each of said gates being connected to one of the input lines of the AND gate of the other channel whereby the enablement of one of said gates disables the other, reset means connected to an input line of each of said gates for cyclically resetting the latter, the improvement of a circuit for distributing successive simultaneous service requests at said requesting ports to different channels of said priority circuit comprising first AND gate means having input terminals connected to said requesting ports, respectively, and having an output terminal, said first gate means being responsive to simultaneous signals at said requesting ports for producing a signal at said output terminal, second and third AND gate means, each having a plurality of input terminals and an output terminal, the output terminals of said second and third gate means being connected to the inputs respectively, of said priority circuit channels, said requesting ports being connected to inputs of said second and third gate means, respectively, at least two flip-flop circuits having a plurality of input and output terminal means and first and second operating states, clock means, said input terminal means of said flip-flop circuits being operatively connected to the outputs of said first gate means and said output terminal means of the flip-flop circuits being connected to the input terminals of said second and third gate means, said flip-flop circuits being responsive to simultaneous signals in the outputs of said first AND gate means to change from the first operating state to the second operating state, fourth and fifth gate means connected to the outputs, respectively, of said priority channels and being responsive thereto to produce outputs, respectively, said second and third gate means being responsive to said outputs, respectively, of said fourth and fifth gate means, said flip-flop circuits having two input terminals and a reset terminal and first and second output terminals, the reset terminal of said flip-flop circuits being connected to the outputs, respectively, of said fourth and fifth gate means, one of said input terminals of one of said flip-flop circuits being connected to one of said requesting ports, one of said input terminals of the other of said flip-flop circuits being connected to the other requesting port, the others of said input terminals of said first and second flip-flop circuits being operatively connected to said first AND gate means, each of said second and third AND gate means comprising an OR gate having two inputs and a third AND gate having two inputs and an output, said outputs of said third AND gate being connected to one of said inputs of said OR gate, the first output terminals of said flip-flop circuits, respectively, being connected to the other input terminals, respectively, of said OR gate.

* * * * *